(12) United States Patent
Chung et al.

(10) Patent No.: US 10,122,488 B2
(45) Date of Patent: Nov. 6, 2018

(54) METHOD FOR TRANSRECEIVING SIGNALS USING USER-SPECIFIC FLEXIBLE TDD TECHNOLOGY IN WIRELESS COMMUNICATION SYSTEM AND DEVICE FOR SAME

(71) Applicant: LG Electronics Inc., Seoul (KR)

(72) Inventors: Jaehoon Chung, Seoul (KR); Genebeck Hahn, Seoul (KR); Eunjong Lee, Seoul (KR); Jinmin Kim, Seoul (KR); Kukheon Choi, Seoul (KR); Kwangseok Noh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/110,226

(22) PCT Filed: Oct. 16, 2014

(86) PCT No.: PCT/KR2014/009729
§ 371 (c)(1),
(2) Date: Jul. 7, 2016

(87) PCT Pub. No.: WO2015/126028
PCT Pub. Date: Aug. 27, 2015

(65) Prior Publication Data
US 2016/0329981 A1    Nov. 10, 2016

Related U.S. Application Data

(60) Provisional application No. 61/941,376, filed on Feb. 18, 2014.

(51) Int. Cl.
*H04J 11/00*   (2006.01)
*H04B 7/26*    (2006.01)
(Continued)

(52) U.S. Cl.
CPC ........ *H04J 11/0023* (2013.01); *H04B 7/2656* (2013.01); *H04H 20/38* (2013.01);
(Continued)

(58) Field of Classification Search
CPC ........ H04H 20/38; H04J 11/0023; H04L 5/14; H04L 69/22; H04W 72/0446;
(Continued)

(56) References Cited

U.S. PATENT DOCUMENTS

2011/0217985 A1\*   9/2011   Gorokhov ............. H04W 24/10
                                                    455/452.2
2013/0279412 A1    10/2013   Webb et al.
(Continued)

FOREIGN PATENT DOCUMENTS

CN     103262596 A    8/2013
JP     2013258785 A   12/2013
(Continued)

OTHER PUBLICATIONS

Ericsson: "Specification impact of dynamic TDD traffic adaptation", R1-121709, 3GPP TSG-RAN WG1 #68bis, Jeju, Korea, Mar. 26-30, 2012.
(Continued)

*Primary Examiner* — Lakeram Jangbahadur
(74) *Attorney, Agent, or Firm* — Dentons US LLP

(57) ABSTRACT

Disclosed in the present application is a method for transreceiving signals between a base station and user equipment in wireless communication system. Specifically, the method comprises a step of transreceiving the signals with the base station, in units of a wireless frame comprising at least one user equipment-shared time resource interval and at least one user equipment-specific time resource interval, wherein the at least one user equipment-specific time resource interval is a time resource interval for transreceiv-
(Continued)

$N_{tot}$ : Total Number of Subframes in One Radio Frame
D : Downlink Subframe
U : Uplink Subframe
S : Special Subframe
X : User-Specifically Configured Subframe ing data between the base station and the user equipment, and wherein the at least one user equipment-shared time resource interval is a time resource interval for transreceiving signals for measuring interference.

6 Claims, 11 Drawing Sheets

(51) Int. Cl.
    *H04W 72/04* (2009.01)
    *H04H 20/38* (2008.01)
    *H04L 5/14* (2006.01)
    *H04L 29/06* (2006.01)

(52) U.S. Cl.
    CPC ............... *H04L 5/14* (2013.01); *H04L 69/22* (2013.01); *H04W 72/042* (2013.01); *H04W 72/0413* (2013.01); *H04W 72/0446* (2013.01)

(58) Field of Classification Search
    CPC ............ H04W 72/042; H04W 72/0413; H04B 7/2656; H04B 7/26
    See application file for complete search history.

(56) References Cited

U.S. PATENT DOCUMENTS

| | | |
|---|---|---|
| 2013/0315192 A1 | 11/2013 | Seo |
| 2014/0044040 A1 | 2/2014 | Chen et al. |
| 2015/0333893 A1* | 11/2015 | Lee ..................... H04L 1/0026 370/252 |
| 2016/0249337 A1* | 8/2016 | Liang .................. H04W 72/042 |

FOREIGN PATENT DOCUMENTS

| | | |
|---|---|---|
| JP | 2015523761 A | 8/2015 |
| JP | 2015523785 A | 8/2015 |
| KR | 10-2010-0139062 A | 12/2010 |
| KR | 10-2011-0041972 A | 4/2011 |
| KR | 10-2012-0092778 A | 8/2012 |
| KR | 10-2012-0123997 A | 11/2012 |
| KR | 10-2013-0084007 A | 7/2013 |
| WO | 2009/128643 A2 | 10/2009 |
| WO | 2011/038410 A1 | 3/2011 |
| WO | 2012/118345 A2 | 9/2012 |
| WO | 2012/138197 A2 | 10/2012 |
| WO | 2013100581 A1 | 7/2013 |
| WO | 2013149177 A2 | 10/2013 |
| WO | 2013166054 A1 | 11/2013 |
| WO | 2013178085 A1 | 12/2013 |
| WO | 2014015266 A2 | 1/2014 |
| WO | 2014019239 A1 | 2/2014 |

OTHER PUBLICATIONS

Qualcomm Incorporated. "CSI measurement and reporting in eIMTA," 3GPP TSG RAN WG1 Meeting #74bis, Oct. 7-11, 2013, R1-134599.

Huawei, HiSilicon, "eIMTA Impact on RAN2," 3GPP TSG-RAN WG2 Meeting #83bis, Oct. 7-11, 2013, R2-133386.

\* cited by examiner

FIG. 2
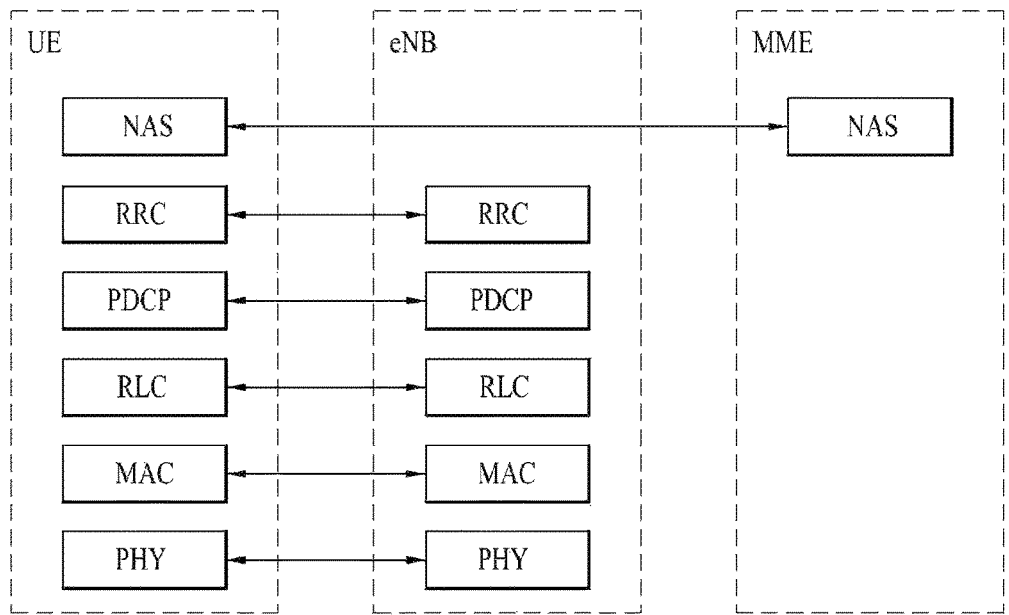
(a) Control - Plane Protocol Stack
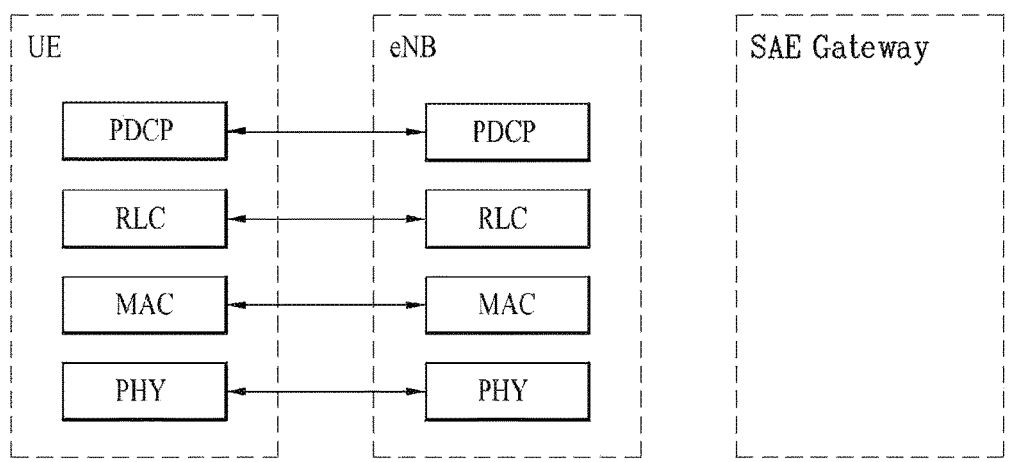
(b) User - Plane Protocol Stack ☐ Downlink User Transmission Resource Interval
▨ Uplink User Transmission Resource Interval $N_{tot}$ : Total Number of Subframes in One Radio Frame
D : Downlink Subframe
U : Uplink Subframe
S : Special Subframe
X : User-Specifically Configured Subframe

FIG. 12

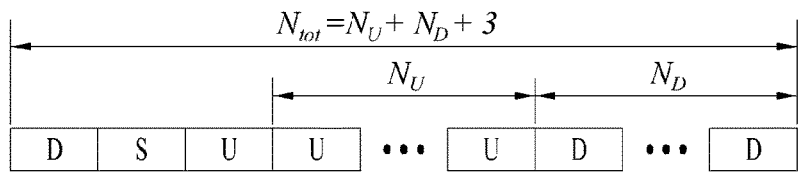

$N_{tot}$ : Total Number of Subframes in One Radio Frame
$N_U$ : Number of Consecutive Uplink Subframes
$N_D$ : Number of Consecutive Downlink Subframes

FIG. 13

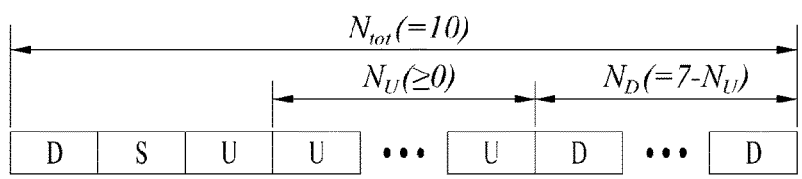

$N_{tot}$ : Total Number of Subframes in One Radio Frame
$N_U$ : Number of Consecutive Uplink Subframes
$N_D$ : Number of Consecutive Downlink Subframes

FIG. 14

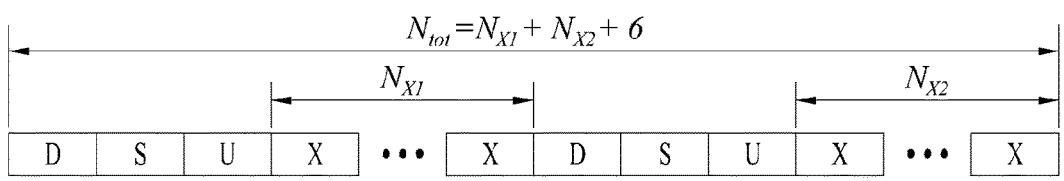

$N_{tot}$ : Total Number of Subframes in One Radio Frame
$N_{X1}$ : Number of First Consecutive Flexible Subframes
$N_{X2}$ : Number of Second Consecutive Flexible Subframes $N_{tot}$ : Total Number of Subframes in One Radio Frame
$N_{X1}$ : Number of First Consecutive Flexible Subframes
$N_{X2}$ : Number of Second Consecutive Flexible Subframes

METHOD FOR TRANSRECEIVING SIGNALS USING USER-SPECIFIC FLEXIBLE TDD TECHNOLOGY IN WIRELESS COMMUNICATION SYSTEM AND DEVICE FOR SAME

This application is a 35 USC § 371 National Stage entry of International Application No. PCT/KR2014/009729 filed on Oct. 16, 2014, and claims priority to U.S. Provisional Application No. 61/941,376 filed on Feb. 18, 2014, all of which are hereby incorporated by reference in their entireties as if fully set forth herein.

TECHNICAL FIELD

The present invention relates to a wireless communication system, and more particularly, to a method and apparatus for transmitting and receiving signals using Fully Flexible user-specific Time Division Duplex ($F^2$ user-specific TDD) in a wireless communication system.

BACKGROUND ART

As an example of a wireless communication system to which the present invention is applicable, a 3rd Generation Partnership Project (3GPP) Long Term Evolution (LTE) communication system will be schematically described.

FIG. 1 is a diagram showing a network structure of an Evolved Universal Mobile Telecommunications System (E-UMTS) as a wireless communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS mainly includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.25, 2.5, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQest (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include an AG, a network node for user registration of the UE, etc. The AG manages mobility of a UE on a Tracking Area (TA) basis. One TA includes a plurality of cells.

Although wireless communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

DISCLOSURE

Technical Problem

An object of the present invention devised to solve the problem is to provide a method and apparatus for transmitting and receiving signals using Fully Flexible user-specific Time Division Duplex ($F^2$ user-specific TDD) in a wireless communication system.

Technical Solution

In an aspect of the present invention, a method for transmitting and receiving signals to and from a Base Station (BS) by a User Equipment (UE) in a wireless communication system includes transmitting and receiving signals to and from the BS on a radio frame basis, a radio frame including at least one UE-common time resource interval and at least one UE-specific time resource interval. The at least one UE-specific time resource interval is used for transmission and reception of data between the BS and the UE, and the at least one UE-common time resource interval is used for transmission and reception of an interference measurement signal used for measuring interference.

In another aspect of the present invention, a UE in a wireless communication system includes a wireless communication module for transmitting and receiving signals to and from a BS, and a processor for processing the signals. The processor controls the wireless communication module to transmit and receive signals to and from the BS on a radio frame basis, a radio frame including at least one UE-common time resource interval and at least one UE-specific time resource interval. The at least one UE-specific time resource interval is used for transmission and reception of data between the BS and the UE, and the at least one UE-common time resource interval is used for transmission and reception of an interference measurement signal used for measuring interference.

The at least one UE-common time resource interval may include one downlink subframe, one special subframe, and one uplink subframe, and the special subframe may include a downlink period, a guard period, and an uplink period.

If the UE incurs interference, the UE may transmit the interference measurement signal in the one uplink subframe or the uplink period of the special subframe. Additionally, information about frequency resources for transmitting the interference measurement signal may be received from the BS.

On the other hand, if the BS incurs interference, the UE may receive the interference measurement signal in the one downlink subframe or the downlink period of the special subframe from the BS.

Additionally, system broadcasting information may be received in the one downlink subframe, and a random access preamble for initial access may be transmitted in the one uplink subframe or the uplink period of the special subframe.

Advantageous Effects

According to the embodiments of the present invention, signals can be transmitted and received efficiently using Fully Flexible user-specific Time Division Duplex (F² user-specific TDD) in a wireless communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 is a diagram showing a control plane and a user plane of a radio interface protocol architecture between a User Equipment (UE) and an Evolved Universal Terrestrial Radio Access Network (E-UTRAN) based on a 3rd Generation Partnership Project (3GPP) radio access network standard.

FIG. 12 is a diagram illustrating an example of the resource configuration of a radio frame for F² user-specific TDD transmission according to the embodiment of the present invention.

FIG. 13 is a diagram showing an example in which the radio frame structure illustrated in FIG. 12 is applied to a radio frame structure of the LTE system.

FIG. 14 is a diagram illustrating another resource configuration of a radio frame for F² user-specific TDD transmission according to the embodiment of the present invention.

BEST MODE

Figure 1:
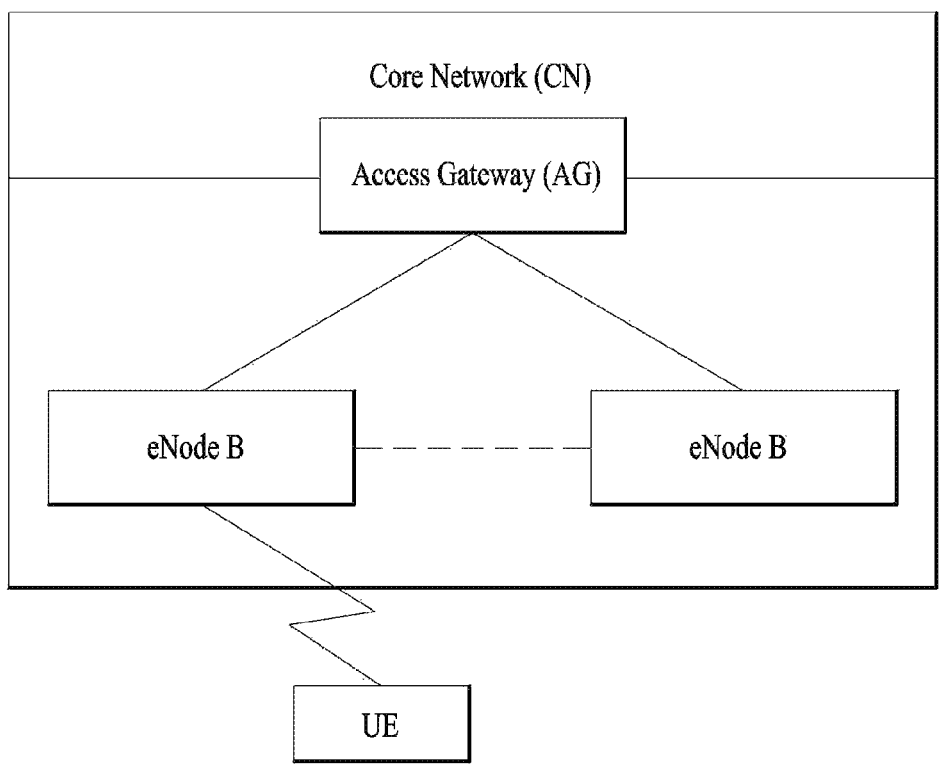
FIG. 1 is a diagram showing a network structure of an Evolved Universal Mobile Telecommunications System (E-UMTS) as an example of a wireless communication system.

The configuration, operation and other features of the present invention will be understood by the embodiments of the present invention described with reference to the accompanying drawings. The following embodiments are examples of applying the technical features of the present invention to a 3rd Generation Partnership Project (3GPP) system.

Although, for convenience, the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

FIG. 2 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel Data is transported between the MAC layer and the PHY layer via the transport channel Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of a higher layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 packet or an IPv6 packet in a radio interface having a relatively small bandwidth.

A Radio Resource Control (RRC) layer located at the bottom of a third layer is defined only in the control plane and is responsible for control of logical, transport, and physical channels in association with configuration, re-configuration, and release of Radio Bearers (RBs). The RB is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located above the RRC layer performs functions such as session management and mobility management.

One cell of the eNB is set to use a bandwidth such as 1.4, 3, 5, 10, 15 or 20 MHz to provide a downlink or uplink transmission service to UEs. Different cells may be set to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
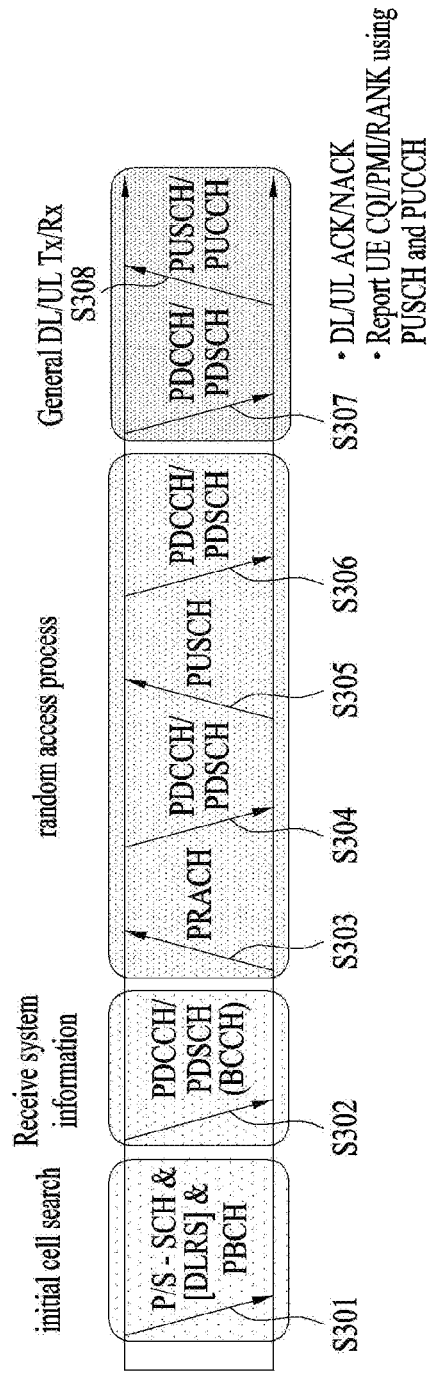
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with an eNB when power is turned on or the UE enters a new cell (S301). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE, which has completed the initial cell search, may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. In this case, the UE may transmit a specific sequence through a Physical Random Access Channel (PRACH) as a preamble (S303 and S305), and receive a response message of the preamble through the PDCCH and the PDSCH corresponding thereto (S304 and S306). In the case of contention-based RACH, a contention resolution procedure may be further performed.

The UE, which has performed the above procedures, may perform PDCCH/PDSCH reception (S307) and Physical Uplink Shared Channel PUSCH)/Physical Uplink Control Channel (PUCCH) transmission (S308) as a general uplink/downlink signal transmission procedure. In particular, the UE receives downlink control information (DCI) through a PDCCH. Here, the DCI includes control information such as resource allocation information of the UE and the format thereof differs according to the use purpose.

The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 4:
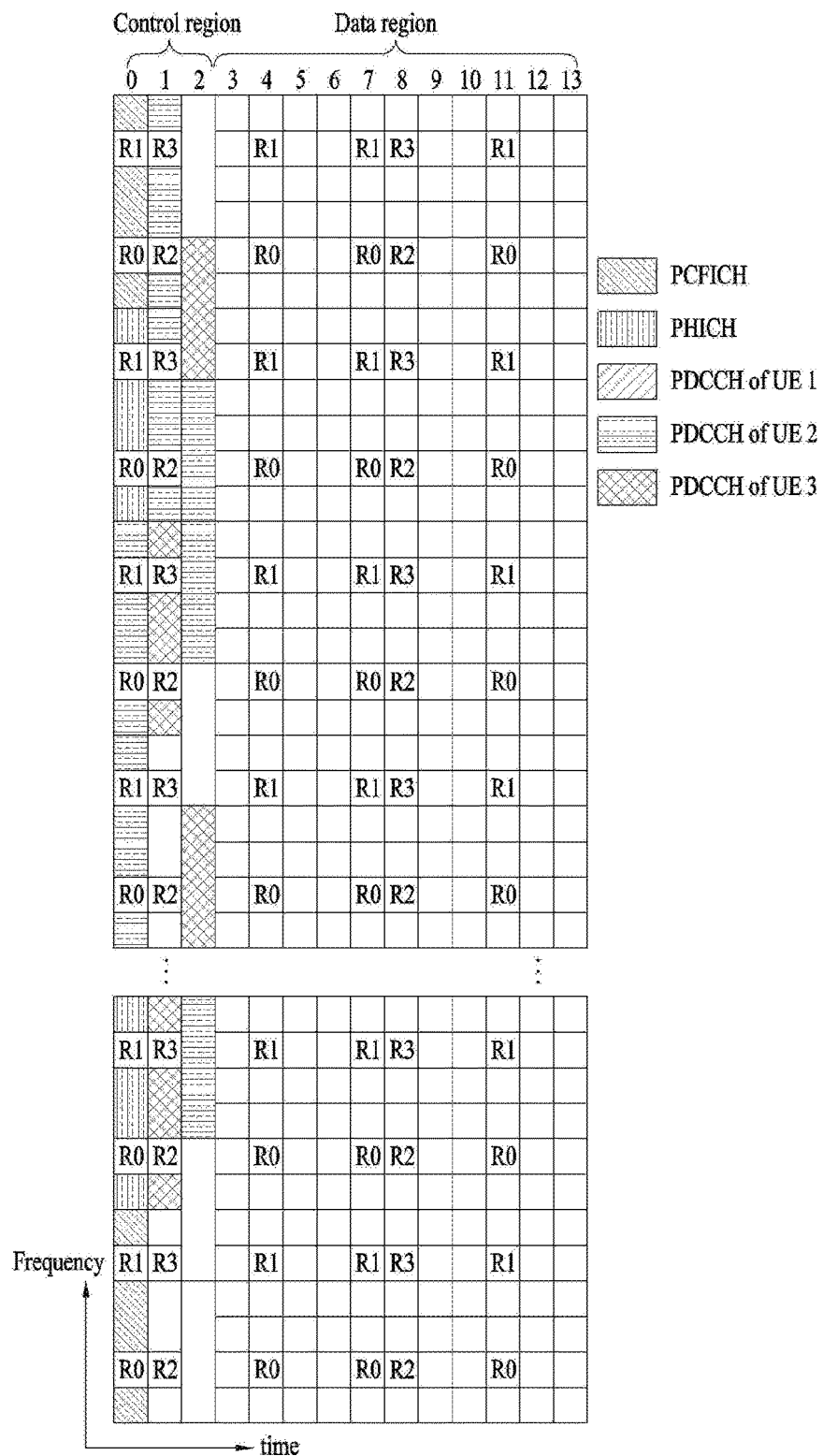
FIG. 4 is a diagram showing the structure of a downlink radio frame used in a Long Term Evolution (LTE) system.

FIG. 4 is a diagram showing a control channel included in a control region of one subframe in a downlink radio frame.

Referring to FIG. 4, a subframe includes 14 OFDM symbols. The first to third OFDM symbols are used as a control region and the remaining 13 to 11 OFDM symbols are used as a data region, according to subframe configuration. In FIG. 4, R1 to R4 denote reference signals (RS) or pilot signals for antennas 0 to 3. The RS is fixed to a constant pattern within a subframe regardless of the control region and the data region. A control channel is allocated to resources, to which the RS is not allocated, in the control region, and a traffic channel is also allocated to resources, to which the RS is not allocated, in the control region. Examples of the control channel allocated to the control region include a Physical Control Format Indicator Channel (PCFICH), a Physical Hybrid-ARQ Indicator Channel (PHICH), a Physical Downlink Control Channel (PDCCH), etc.

The Physical Control Format Indicator Channel (PCFICH) informs the UE of the number of OFDM symbols used for the PDCCH per subframe. The PCFICH is located at a first OFDM symbol and is configured prior to the PHICH and the PDCCH. The PCFICH includes four Resource Element Groups (REGs) and the REGs are dispersed in the control region based on a cell identity (ID). One REG includes four resource elements (REs). The PCFICH has a value of 1 to 3 or 2 to 4 according to bandwidth and is modulated using a Quadrature Phase Shift Keying (QPSK) scheme.

The Physical Hybrid-ARQ Indicator Channel (PHICH) is used to carry HARQ ACK/NACK for uplink transmission. That is, the PHICH refers to a channel via which DL ACK/NACK information for uplink HARQ is transmitted. The PHICH includes one REG and is scrambled on a cell-specific basis. ACK/NACK is indicated by one bit and is modulated using a binary phase shift keying (BPSK) scheme. The modulated ACK/NACK is repeatedly spread with a spreading factor (SF) of 2 or 4. A plurality of PHICHs mapped to the same resources configures a PHICH group. The number of PHICHs multiplexed in the PHICH group is determined according to the number of spreading codes. The PHICH (group) is repeated three times in order to obtain diversity gain in a frequency region and/or time region.

The Physical Downlink Control Channel (PDCCH) is allocated to the first n OFDM symbols of a subframe. Here, n is an integer of 1 or more and is indicated by a PCFICH. The PDCCH includes one or more Control Channel Elements (CCEs). The PDCCH informs each UE or a UE group of information associated with resource allocation of a Paging Channel (PCH) and a Downlink-Shared Channel (DL-SCH), both of which are transport channels, uplink scheduling grant, HARQ information, etc. The paging channel (PCH) and the downlink-shared channel (DL-SCH) are transmitted through a PDSCH. Accordingly, the eNB and the UE transmit and receive data through the PDSCH except for specific control information or specific service data.

Information indicating to which UE (one or a plurality of UEs) data of the PDSCH is transmitted and information indicating how the UEs receive and decode the PDSCH data are transmitted in a state of being included in the PDCCH. For example, it is assumed that a specific PDCCH is CRC-masked with a Radio Network Temporary Identity (RNTI) "A", and information about data transmitted using a radio resource (e.g., frequency location) "B" and transmission format information (e.g., transmission block size, modulation scheme, coding information, or the like) "C" is transmitted via a specific subframe. In this case, one or more UEs located within a cell monitor a PDCCH using its own RNTI information, and if one or more UEs having "A" RNTI are present, the UEs receive the PDCCH and receive the PDSCH indicated by "B" and "C" through the information about the received PDCCH.

Figure 5:
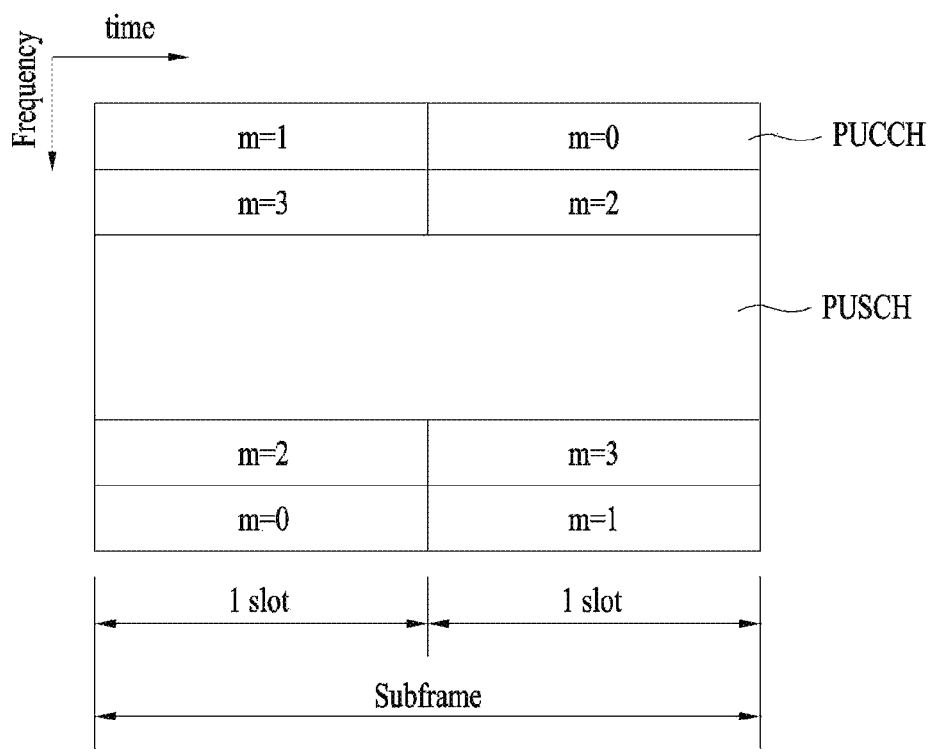
FIG. 5 is a diagram showing the structure of an uplink subframe used in an LTE system.

FIG. 5 is a diagram showing the structure of an uplink subframe used in an LTE system.

Referring to FIG. 5, an uplink subframe may be divided into a region to which a Physical Uplink Control Channel (PUCCH) carrying uplink control information is allocated and a region to which a Physical Uplink Shared Channel (PUSCH) carrying user data is allocated. A middle portion of the subframe is allocated to the PUSCH and both sides of a data region in a frequency domain are allocated to the PUCCH. Uplink control information transmitted on the PUCCH includes an ACK/NACK signal used for HARQ, a Channel Quality Indicator (CQI) indicating a downlink channel status, a rank indicator (RI) for MIMO, a scheduling request (SR) which is an uplink radio resource allocation request, etc. The PUCCH for one UE uses one resource block occupying different frequencies in slots within the subframe. Two slots use different resource blocks (or subcarriers) within the subframe. That is, two resource blocks allocated to the PUCCH are frequency-hopped in a slot boundary. FIG. 5 shows the case in which a PUCCH having m=0, a PUCCH having m=1, a PUCCH having m=2, and a PUCCH having m=3 are allocated to the subframe.

Figure 6:
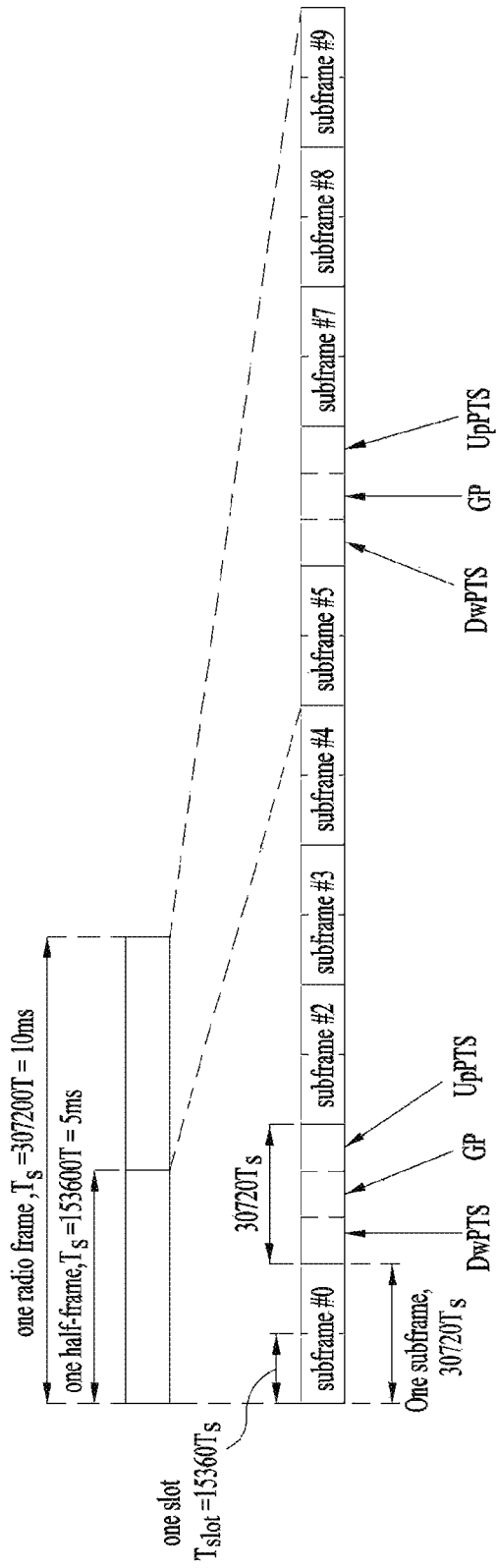
FIG. 6 is a diagram showing the structure of a radio frame used in an LTE TDD system.

FIG. 6 is a diagram showing the structure of a radio frame in an LTE TDD system. In an LTE TDD system, the radio frame includes two half frames, each of which includes four normal subframes including two slots and a special subframe including a downlink pilot time slot (DwPTS), a guard period (GP), and an uplink pilot time slot (UpPTS).

In the special subframe, the DwPTS is used for initial cell search, synchronization and channel estimation at a user equipment. The UpPTS is used for channel estimation of a base station and uplink transmission synchronization of the user equipment. That is, the DwPTS is used for downlink transmission and the UpPTS is used for uplink transmission. In particular, the UpPTS is used for PRACH preamble or SRS transmission. The guard period is used to remove interference occurring in uplink due to multi-path delay of a downlink signal between uplink and downlink. Total 9 configurations for a structure of the special subframe are currently defined as shown in Table 1 below in the 3GPP standard.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |

TABLE 1-continued

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 7 | $21952 \cdot T_s$ | | | — | — | — |
| 8 | $24144 \cdot T_s$ | | | — | — | — |

In the LTE TDD system, an uplink/downlink (UL/DL) configuration is shown in Table 2 below.

TABLE 2

| Uplink-downlink configuration | Downlink-to-Uplink Switch-point periodicity | subframe number |
|---|---|---|
| 0 | 5 ms | |
| 1 | 5 ms | |
| 2 | 5 ms | |
| 3 | 10 ms | |
| 4 | 10 ms | |
| 5 | 10 ms | |
| 6 | 5 ms | |

In Table 1 above, D denotes a downlink subframe, U denotes an uplink subframe and S denotes the special subframe. Table 1 above shows a downlink-to-uplink switch-point periodicity in the UL/DL configuration in each system.

Use of a single fixed UL-DL configuration as listed in [Table 2] to prevent interference between BSs and interference between UEs is considered as a general method in implementing and managing an LTE TDD system. Although a duplex scheme in the form of TDD applied to such a single transmission frequency band is represented effectively as bi-directional full-duplex in a general long time interval, it is half-duplex in a unit time interval, strictly from the viewpoint of technology.

The present invention provides a Fully Flexible user-specific TDD ($F^2$ user-specific TDD) scheme for increasing the use efficiency of a frequency band and actively supporting differentiated UL-DL data asymmetry incurred by a user-wise service and application, and a method for effectively implementing Full-Duplex Radio (FDR) for simultaneous transmission and reception in an ultimate single frequency band.

From the perspective of a wireless device, FDR using a single transmission frequency band may be defined as a transmission resource configuration scheme in which transmission and reception are simultaneously performed in the single transmission frequency band. For example, FUR may be represented as a transmission resource configuration scheme in which DL transmission and UL reception of a general BS (a relay, a relay node, a Remote Radio Head (RRH), or the like) and DL reception and UL transmission of a UE are simultaneously performed in a single transmission frequency band during wireless communication between the BS and the UE. In another example, FUR may be represented as a transmission resource configuration scheme in which transmission and reception between UEs are performed simultaneously in the same transmission frequency band during Device-to-Device (D2D) communication.

While the following description is given of proposed techniques in relation to FDR in the context of wireless transmission and reception between a general BS and a general UE, it is to be understood that the same thing applies to a wireless network device other than a general BS, which performs wireless transmission and reception with a UE, and further to D2D communication.

Figure 7:
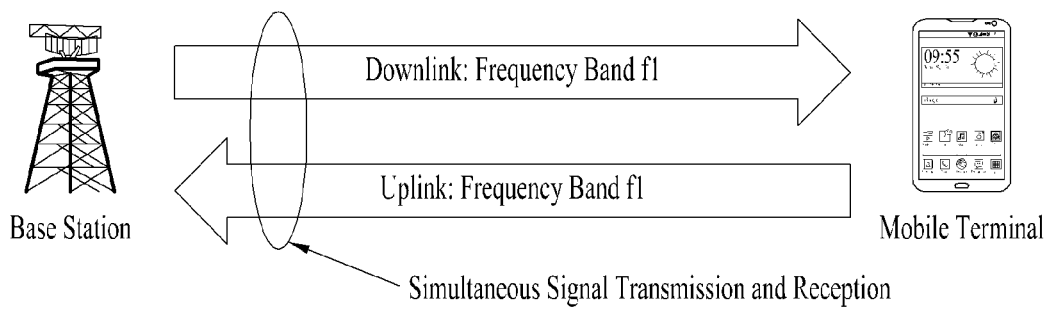
FIG. 7 is a diagram showing the basic concept of full-duplex radio through exemplary wireless communication between a Base Station (BS) and a User Equipment (UE).

FIG. 7 illustrates the basic concept of FDR through exemplary wireless communication between a BS and a UE.

Referring to FIG. 7, since FDR supports bi-directional wireless communication in a single transmission frequency band (frequency band f1 in FIG. 7), it may offer a system gain which increases frequency use efficiency. For this purpose, however, a technique for effectively suppressing or canceling new types of interference faced by a wireless device should be implemented.

As one of the new interference types, interference may occur when a transmission signal from a transmitter of a wireless device (a BS or a UE) is introduced into a receiver of the same wireless device. This is defined as self-interference.

Figure 8:
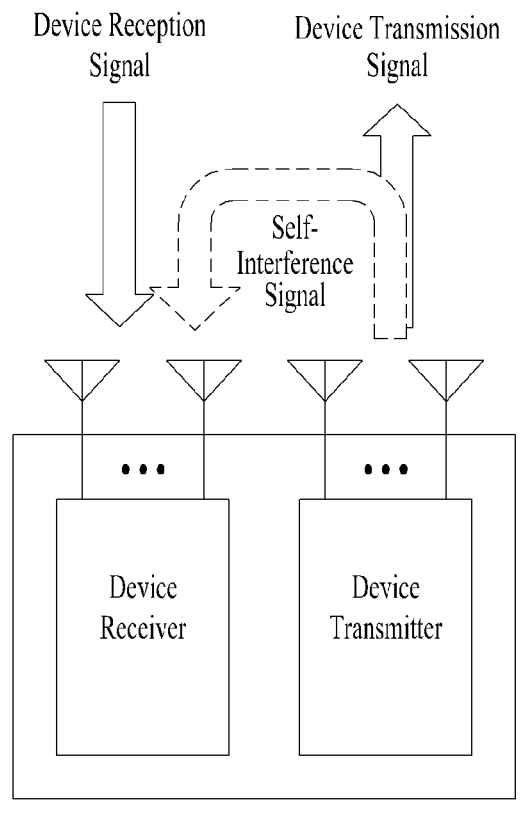
FIG. 8 is a conceptual diagram showing self-interference generated during full-duplex radio transmission and reception in a wireless device.

FIG. 8 conceptually illustrates self-interference experienced by a wireless device during FDR transmission and reception.

Referring to FIG. 8, self-interference of a wireless device operating in FDR adversely affects the wireless signal reception performance of the wireless device, and as a power ratio of a self-interference signal to a received signal increases, the reception performance is degraded severely.

Another type of interference caused by the FUR transmission scheme is multi-user interference. Multi-user interference may be defined as a phenomenon that among a plurality of FDR devices relatively near to each other, signals transmitted in the same frequency band from devices are introduced as interference to devices receiving signals in the frequency band.

Figure 9:
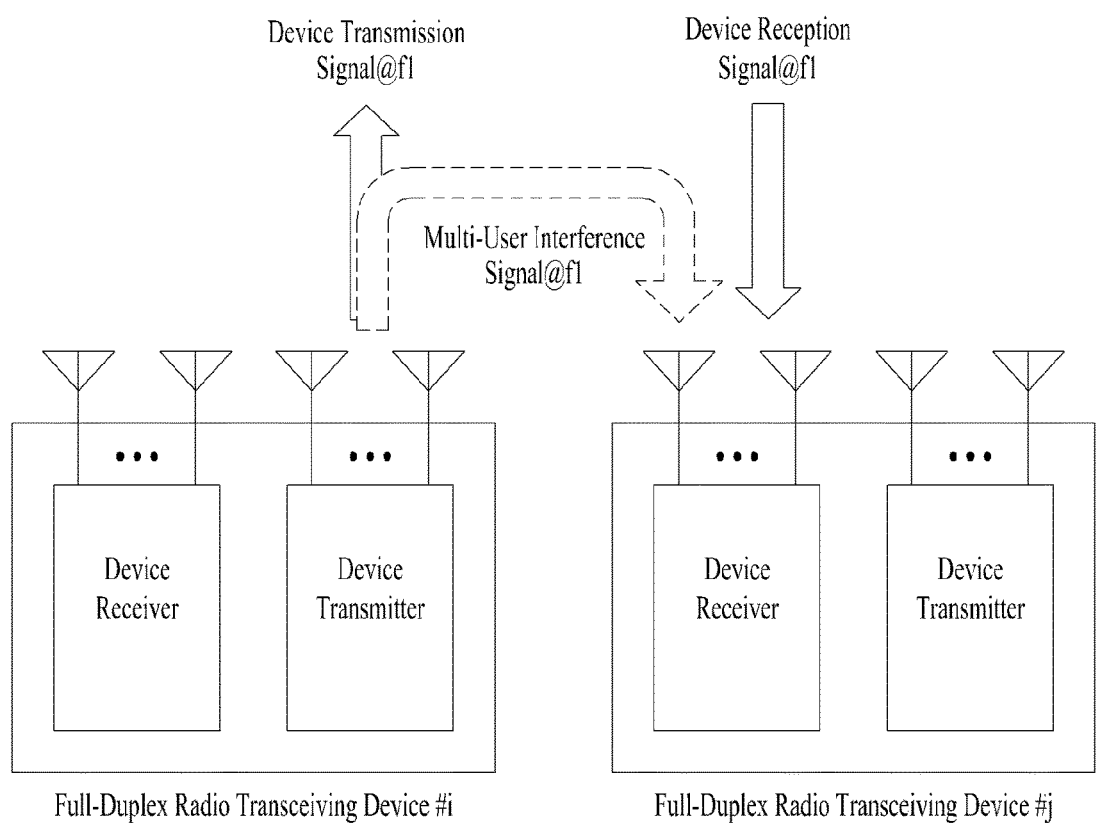
FIG. 9 is a conceptual diagram showing multi-user interference generated between two wireless devices to which full-duplex radio is applied.

FIG. 9 illustrates the concept of multi-user interference generated between two wireless devices operating in FDR.

Referring to FIG. 9, as a transmitting wireless device and a receiving wireless device are nearer, for reference transmission power, and the transmission power of the transmitting wireless device is stronger, multi-user interference introduced to a receiver of the receiving wireless device becomes stronger.

Properties of each interference type caused by the above-described application of FDR are listed in [Table 3] below.

TABLE 3

| Interference types | Detection of modulation symbol information | Interference signal strength | Factors determining interference influence |
|---|---|---|---|
| Self-interference | O | Very large | Power ratio of self-interference signal to received signal |
| Multi-user interference | X | Variable | Distance to interfering device, transmission power of interfering device |

Effective mitigation or cancellation of multi-user interference by a digital baseband scheme such as transmission resource scheduling, power control, multi-antenna beamforming, and the like, and a wireless resource scheduling scheme may be considered.

On the other hand, processing self-interference involves the requirement that an Analog-to-Digital Converter (ADC) of a receiver performs digital quantization on a received signal without distortion as intended, only when an interference signal of at least 60 dB and up to 100 dB or more is canceled according to a wireless network coverage (network node transmission power) condition and a transmission rate matching situation before processing in the ADC, in consideration of the worst situation with maximum transmission power and minimum reception sensibility.

Considering that lots of implementation complexity and processing cost are taken to enable a receiver of a wireless device to cancel self-interference before the ADC stage, a transmission scheme for efficiently reducing the implementation complexity and the processing cost, while achieving a gain that FDR conceptually seeks may be considered.

The present invention proposes an $F^2$ user-specific TDD transmission scheme in order to increase the frequency use efficiency of a system, support the asymmetry of user-wise UL/DL data as much as possible, and confine self-interference to a receiver of a BS.

Figure 10:
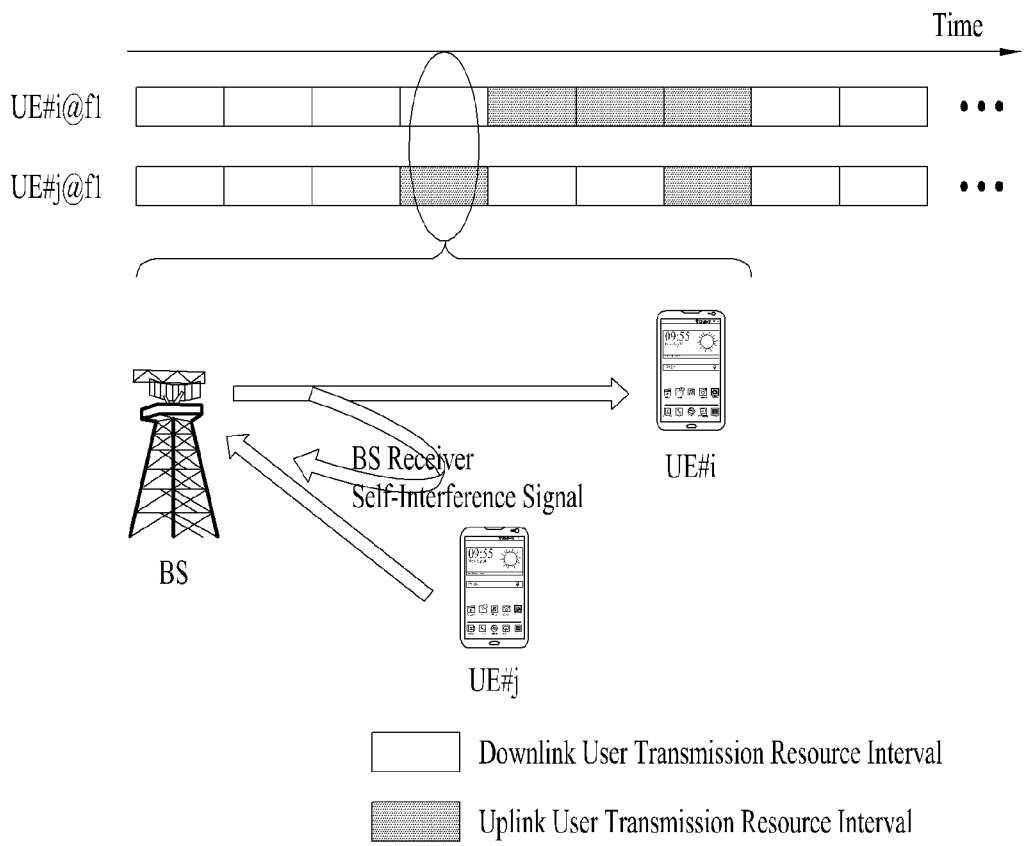
FIG. 10 is a diagram showing the basic concept of Fully Flexible user-specific Time Division Duplex (F² user-specific TDD) transmission through exemplary wireless communication between a BS and a UE.

FIG. 10 illustrates the basic concept of $F^2$ user-specific TDD transmission through exemplary wireless communication between a BS and a UE.

Referring to FIG. 10, $F^2$ user-specific TDD wireless communication is a scheme of configuring a DL time interval resource and a UL time interval resource uniquely for each individual UE according to a service or an application program of the individual UE. A time interval resource generically refers to a time slot, a subframe, or a frame, which includes one or more transmission symbols. Wireless communication resource allocation optimized for the characteristics of an individual UE-wise service and application may be supported, and at the same time, the gain of increasing the total frequency use efficiency of BS coverage may be achieved, by $F^2$ user-specific TDD wireless communication.

If the $F^2$ user-specific TDD transmission scheme proposed by the present invention is applied to wireless communication between a BS and a UE, a UL signal transmission operation and a DL signal reception operation of the UE are distinguished from each other without overlap in the time domain, no self-interference occurs to the UE. On the contrary, when a DL transmitter transmits a DL signal to another UE at a time of receiving a signal from the UE at a UL receiver in the BS, self-interference may occur to the BS.

Considering that high implementation complexity and processing cost may be taken to cancel self-interference in FDR, the proposed $F^2$ user-specific TDD transmission scheme may enable a BS to accept complexity and cost in return for the afore-described gain, and minimize the increase of implementation complexity and processing cost of a UE.

Compared to FDR, the $F^2$ user-specific TDD transmission scheme has the following characteristics listed in [Table 4] below in wireless communication between a BS and a UE.

TABLE 4

| Characteristic element | $F^2$ user-specific TDD | Full-Duplex Radio (FDR) |
|---|---|---|
| Frequency efficiency | Total frequency use efficiency is increased on a BS basis. | Frequency use efficiency is increased on a UE basis. |

TABLE 4-continued

| Characteristic element | $F^2$ user-specific TDD | Full-Duplex Radio (FDR) |
|---|---|---|
| User UL/DL resource configuration | User-wise flexible | User-wise flexible |
| UE interference element | Self-interference, multi-user interference | multi-user interference |
| BS interference element | Self-interference, multi-user interference | Self-interference, multi-user interference |

Hereinbelow, the present invention proposes techniques for effectively applying the $F^2$ user-specific TDD transmission scheme to wireless communication between a BS and a UE.

Embodiment 1

An embodiment of the present invention proposes a resource configuration of a radio frame, dedicated to $F^2$ user-specific TDD transmission.

A basic a resource configuration of a radio frame may have the following characteristics in applying the $F^2$ user-specific TDD transmission scheme to wireless communication between a BS and a UE.
- Subframe: A subframe is a minimum transmission and reception event time unit (a unit of scheduling (Transmission Time Interval: TTI), or a continuous transmission and reception duration) in $F^2$ user-specific TDD transmission. A subframe includes $N_{sys}$ OFDM symbols. If the basic resource configuration of the 3GPP LTE system is adopted, a subframe may include 14 OFDM symbols in a normal CP case and 12 OFDM symbols in an extended CP case, and may be divided into two slots.
- Radio frame: A radio frame is a maximum transmission unit in $F^2$ user-specific TDD transmission, including $N_{tot}$ subframes.
- Special subframe: To prevent overlap between a transmission interval and a reception interval caused by a propagation delay and a Timing Advance (TA) mechanism used for UL reception synchronization in switching from a DL frame to a UL frame on a BS-UE link, it is necessary to secure a guard time equal to or longer than the round trip delay of the link. To support this, a special frame is defined and includes a DL transmission symbol, a guard interval symbol, and a UL transmission symbol.
- For $F^2$ user-specific TDD transmission, a radio frame may include subframes configured to be common to all users within a cell or system and flexible frames which may be configured as user-specific DL or UL subframes, or designed for DL or UL transmission.

Figure 11:
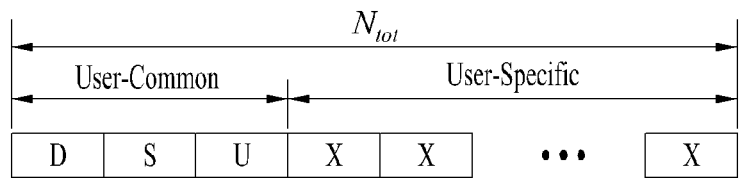
FIG. 11 is a diagram illustrating a resource configuration of a radio frame for F² user-specific TDD transmission according to an embodiment of the present invention.

FIG. 11 illustrates a resource configuration of a radio frame for $F^2$ user-specific TDD transmission according to an embodiment of the present invention. Referring to FIG. 11, it may be noted that user-common subframes include three subframes in the order of a DL subframe, a specifial subframe, and a UL subframe.

FIG. 12 illustrates an example of the resource configuration of a radio frame for $F^2$ user-specific TDD transmission according to the embodiment of the present invention.

Referring to FIG. 12, although a user-common subframe interval includes three D-S-U subframes and is disposed at the start of the radio frame structure, the user-common subframe interval may be disposed at the last or arbitrary position of the radio frame structure.

Also, while one user-common subframe interval is defined per frame in FIG. 12, this is done for the purpose of maximizing the duration of a user-specific flexible subframe interval. In other words, the period of a user-common subframe interval (or a special subframe) is one radio subframe length. On the other hand, to reduce a transmission delay of data/control information through system UL and DL synchronization or fast switching from a UL to a DL, a structure in which a plurality of user-common subframe intervals are configured in a radio frame by making the gaps between the intervals equal or as equal as possible may be applied.

FIG. 13 illustrates an example in which the radio frame structure of FIG. 12 is applied to a radio frame structure of the LTE system.

For possible cases of $N_U$ and $N_D$, DL-UL resource ratios (except for a special subframe) are given as follows in FIG. 13.
$\{N_U,N_D\}=\{1:6\}\leftarrow$DL:UL=8:1
$\{N_U,N_D\}=\{1:6\}\leftarrow$DL:UL=7:2
$\{N_U,N_D\}=\{2:5\}\leftarrow$DL:UL=6:3
$\{N_U,N_D\}=\{3:4\}\leftarrow$DL:UL=5:4
$\{N_U,N_D\}=\{4:3\}\leftarrow$DL:UL=4:5
$\{N_U,N_D\}=\{5:2\}\leftarrow$DL:UL=3:6
$\{N_U,N_D\}=\{6:1\}\leftarrow$DL:UL=2:7
$\{N_U,N_D\}=\{7:0\}\leftarrow$DL:UL=1:8

FIG. 14 is a diagram illustrating another resource configuration for a radio frame for $F^2$ user-specific TDD transmission according to the embodiment of the present invention. Particularly, FIG. 14 illustrates an $F^2$ user-specific TDD radio frame structure including two user-common subframe intervals and two user-specific flexible subframe intervals.

While the user-common subframe intervals are arranged periodically at an interval of half the length of a radio frame in the structure of FIG. 14, the user-common subframe intervals may be arranged in a pattern other than the equidistant arrangement.

Figure 15:
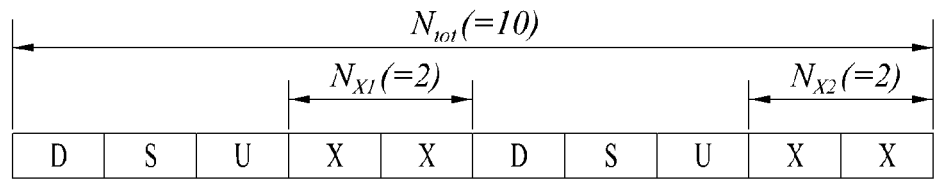
FIG. 15 is a diagram showing an example in which the radio frame structure illustrated in FIG. 14 is applied to a radio frame structure of the LTE system.

FIG. 15 is a diagram showing an example in which the radio frame structure illustrated in FIG. 14 is applied to the radio frame structure of the LTE system.

Referring to FIG. 15, a total of four subframes out of 10 subframes in a 10-ms radio frame may be used as user-specific flexible subframes which may be configured as UL subframes or DL subframes for each user according to the situation of the user. Examples of possible configurations of the flexible subframes are given as follows according to the order of the positions of the flexible subframes illustrated in FIG. 15.
$\{X,X,X,X\}=\{D,D,D,D\}\leftarrow$DL:UL resource configuration ratio 6:2
$\{X,X,X,X\}=\{U,D,D,D\}$ or $\{D,D,U,D\}\leftarrow$DL:UL resource configuration ratio 5:3
$\{X,X,X,X\}=\{U,D,U,D\}$ or $\{U,U,D,D\}$ or $\{U,U,D,D\}\leftarrow$DL:UL resource configuration ratio 4:4
$\{X,X,X,X\}=\{U,U,U,D\}$ or $\{U,D,U,U\}\leftarrow$DL:UL resource configuration ratio 3:5
$\{X,X,X,X\}=\{U,U,U,U\}\leftarrow$DL:UL resource configuration ratio 2:6

Embodiment 2

Another embodiment of the present invention proposes a method for configuring DL and UL transmission resources on a UE basis in the $F^2$ user-specific TDD transmission scheme.

(1) Dynamic UL/DL Transmission Resource Scheduling

First of all, a BS dynamically determines whether to configure one or more individual time duration resources within an arbitrary time period as DL or UL transmission resources. Subsequently, the BS may signal a bitmap or the index of a resource configuration to a UE by a dynamic DL PDCCH or a MAC Control Element (CE).

(2) Semi-Static UL/DL Transmission Resource Configuration

Then, a method for configuring and updating UL/DL resources of time duration resources within a time area given to an individual UE, and signaling bitmap information or the index of a resource configuration by semi-static Radio Resource Control (RRC) signaling (that is, transmitted once during a relatively long time period) may be considered.

(3) Hybrid Dynamic/Semi-Static UL/DL Transmission Resource Scheduling

Finally, a method may be considered, which dynamically determines whether to configure one or more individual time duration resources within an arbitrary time period as DL or UL transmission resources and signals the determination to a UE by a dynamic PDCCH by a BS, in addition to a method for configuring and updating UL/DL transmittable resources of time duration resources within a time area given to an individual UE using bitmap information or index information of a resource configuration through RRC signaling (that is, the scheduling method of (2)).

Embodiment 3

In a third embodiment of the preset invention, a method for operating a system and a UE during a user-common subframe interval in an $F^2$ user-specific TDD radio frame structure will be described.

Since half-duplex wireless transmission is ensured for both a BS and a UE during a user-common subframe interval in the situation where basic network synchronization has been acquired in FIG. 12, the user-common subframe interval is meaningful in that generation of self-interference or inter-device interference is restricted. Based on this, a specific transmission/reception signal may be designed in the user-common subframe interval, for the purpose of optimization of in $F^2$ user-specific TDD, that is, transmission and reception during the user-specific flexible subframe interval, or methods for configuring total channels including the specific transmission/reception signal may be designed. Further, a UE operation associated with them may be applied.

In the present invention, a description will be given of measurement of wireless channel information for a potential interference aggressor, an operation for DL transmission of system information, and an operation for UL transmission of a random access preamble.

A) Measurement of Wireless Channel Information (Channel Vector, Signal Strength, Reception Timing, Etc.) for Potential Interference Aggressor Interference between devices within the coverage of a wireless unit network node may be mainly UE-to-UE interference (D2D interference type-I). D2D interference that may be determined for the whole coverage of a plurality of wireless network nodes may include BS-to-BS interference (D2D interference type-II) and UE-to-BS interference (D2D interference type-III), and BS-to-UE interference (D2D interference type-IV).

If the above types of interference occur, a receiver may need to determine the characteristics of an interference signal, including a channel vector, a signal strength, a reception timing, and the like, in order to effectively cancel the interference. To enable the receiver to determine the characteristics of an interference signal, there may be a need for a procedure for detecting/receiving a signature signal, a pilot signal, or a physical channel requiring demodulation and decoding from a potential interference aggressor.

To perform the procedure during the user-common subframe interval, a method for configuring a signal and transmission resources for a potential interference aggressor, and an operation of a receiver after related detection and measurement will be described below.

First, a description will be given of a transmission scheme of a measurement signal of a D2D interference aggressor and a method for configuring transmission resources for a D2D interference aggressor. For the four D2D interference cases, the interference aggressors are classified as a UE and a BS as listed in [Table 5].

TABLE 5

| Aggressor type | Interference case |
| --- | --- |
| UE | D2D interference type-I/III |
| BS | D2D interference type-II/IV |

If the interference aggressor is a UE, the UE may transmit a signal used for an adjacent device to measure the characteristics of an interference signal, in a UL subframe or an Uplink Pilot Time Slot (UpPTS) of a special subframe, which is UL transmission time duration resources of the user-common subframe interval.

In the case where a receiver measuring the characteristics of the interference signal is a UE (type-I) or a BS (type-III), the receiver is likely to receive the transmission signal of the interference aggressor, in an asynchronous state with respect to a data reception reference and may significantly need to detect a signal reception timing. Therefore, it is preferred that the transmission signal of the interference aggressor for use in measurement is a signature or preamble signal mapped to a sequence having a clear zero correlation period of time samples and providing sufficient orthogonal resources, rather than a pilot signal or a physical channel.

For example, in the 3GPP LTE or LTE-A system, a UL synchronization signal, Physical Random Access Channel (PRACH) preamble may be used for the above purpose. In this case, a preamble in which a Zhadoff-Chu (ZC) Constant Amplitude Zero Auto-Correlation (CAZAC) sequence securing a Zero-Correlation Zone (ZCZ) is mapped directly to time samples is applied. If a signal used for measuring the characteristics of an interference signal is designed to, for example, have a different length from a PRACH preamble in applying $F^2$ user-specific TDD, the PRACH sequence may also be applied in order to provide a sufficient asynchronous timing capability and a Cyclic Shift (CS)-based orthogonal resource capacity to the time samples.

Hereinbelow, specific application examples of the type of a transmission signal used for interference measurement and a resource configuration for the transmission signal will be described.

(a) Signal transmission resources of a UE as an interference aggressor, for measurement of D2D interference information may be configured only in the user-common subframe interval.

The configured time duration resources may be defined as a UpPTS symbol period of a special subframe. On the other hand, frequency resources are defined separately in a frequency area which is not overlapped with existing PRACH transmission frequency resources in order to avoid overlap with the PRACH transmission resources used for initial access, and this definition may be indicated to UEs in advance by setting it as system control information, that is, an RRC parameter through user-common signaling or user-specific signaling.

(b) As a modification of (a), all interference signal resources may be applied in the same manner as (a), and time duration resources for an interference measurement signal may be configured only in a UL frame of the user-common subframe interval. In other words, (b) may be applied for the purpose of extending the coverage restricted by the limited PRACH preamble length encountered with (a).

(c) As an extension of (a) and (b), frequency resources for an interference measurement signal may be configured in the same manner as (a), and information indicating whether time duration resources for the interference measurement signal are configured in the UpPTS of a special subframe or a UL subframe within the user-common subframe interval may be set as system control information, that is, an RRC parameter and signaled to UEs preliminarily by user-common signaling or user-specific signaling.

Or, time duration resources for the interference measurement signal may be configured in both the UpPTS of a special subframe and a UL subframe within the user-common subframe interval may be set as system control information, that is, an RRC parameter and signaled to UEs preliminarily by user-common signal or user-specific signaling. In this case, a UE receiving the interference measurement signal or, when needed, a BS may detect the signal and measure interference in the time duration resources of both the UpPTS and the UL subframe.

(d) As an extension of Embodiment 1, Embodiment 2, and Embodiment 3, when needed, secondary PRACH time subframe resources serving the purpose of D2D interference measurement may be separately configured in a subframe which does not overlap with a subframe used for PRACH transmission for initial access, and information about the configuration of the time duration resources may be set as system control information, that is, an RRC parameter and signaled to UEs preliminarily by user-common signaling or user-specific signaling.

Herein, it may occur that subframe resources are configured overlapped. In this case, the transmitting UE may be configured to transmit or not to transmit a D2D interference measurement signal in an overlapped subframe. The receiving UE or BS may receive the D2D interference measurement signal, on the assumption that the D2D interference measurement signal is transmitted in the overlapped subframe, or may not receive the D2D interference measurement signal in the overlapped subframe.

On the other hand, if the interference aggressor is a BS, the BS may transmit a signal used for an adjacent device to measure the characteristics of an interference signal, in a DL subframe or a Downlink Pilot Time Slot (DwPTS) of a special subframe, which is DL transmission time duration resources of the user-common subframe interval.

In the case where a receiver measuring the characteristics of an interference signal is a BS (type-II) or a UE (type-IV), the receiver is likely to independently detect reception synchronization by searching for a cell based on a DL synchronization signal or signaling of related information from a network. Therefore, it is preferred that the transmission signal of the interference aggressor for use in measurement is a pilot signal or a physical channel, in terms of measurement of channel quality-related signal strength or channel vector information.

For example, in the 3GPP LTE or LTE-A system, a DL Reference Signal (RS), that is a pilot signal may be used for measuring wireless channel information from a potential interference aggressor. The DL RS may be a Cell-specific Reference Signal (CRS) used for the above purpose.

For example, 3GPP LTE BS-specific RSs may include a CRS defined by one RS resource configured commonly for users on a BS basis, and a Channel Status Information-Reference Signal (CSI-RS) defined by allocating a plurality of channel measurement RS resources to a UE through signaling of configuration information on a user basis from the viewpoint of a virtual cell. In this case, if a BS is an interference aggressor in the present invention, a CRS or a CSI-RS may be used as a D2D interference measurement RS. Now, a description will be given of specific application methods in the embodiments.

(e) If a measurement signal that a BS transmits to enable a receiver (a BS in type-II and a UE in type-IV) to measure D2D interference type-II or type-IV is defined as a CRS, the receiving BS (in type-II) may configure CRS resources, that is, a time-frequency pattern for interference measurement in order to reduce power consumption or complexity involved in D2D interference measurement, or a serving BS (in type-IV) may configure CRS resources or a time-frequency pattern, set the configuration as an RRC parameter, and signal the RRC parameter to the UE preliminarily by user-common signaling or user-specific signaling. The time-frequency pattern may be a frequency shift offset of a CRS and/or a physical cell ID serving as a scrambling seed. Additionally, a message for exchanging time-frequency pattern information between adjacent BSs may be defined and exchanged via an X2 interface between the BSs.

(f) A case in which a measurement signal that a BS transmits to enable a receiver to measure D2D interference type-II or type-IV is defined as a CSI-RS will be described. Since a CSI-RS is configured differently according to a wireless transmission function configured on a user basis, CSI-RS resources configured uniquely on a cell basis or on a network node basis, that is, a time-frequency RS pattern and a cell-specific scrambling code seed value may be defined for the purpose of D2D interference measurement in the case where a BS is an interference aggressor.

To share this resource configuration information, a message for exchanging time-frequency pattern information between adjacent BSs may be defined and exchanged via an X2 interface between the BSs. On the premise that information is shared between BSs in this manner, a serving BS may set the above information as an RRC parameter and signals the RRC parameter to a UE preliminarily by user-common signaling or user-specific signaling in the case of type-IV interference measurement.

The type of an interference measurement signal transmitted by an interference aggressor, for allowing a receiver to measure interference, and the method for configuring signal transmission resources in the case where the interference aggressor is a UE have been described above. Additionally, methods for configuring transmission resources for a D2D interference measurement signal on an individual user basis are required. The following method i) to method iii) are given as resource configuration techniques.

Method i) Orthogonal resources for a signal, used by each aggressor UE are set as an RRC parameter and signaled preliminarily by user-specific signaling.

Resources for a D2D interference measurement signal transmitted by an aggressor UE may be configured from among total M sets of transmission resources for an interference measurement signal, specified by a BS, and the configuration may be set as a user-specific RRC parameter and signaled on an individual user basis, according to the above-described method. In this case, as many orthogonal resources as the number of aggressor UEs are required. In a situation where the number of aggressor UEs is limited, this may be applied as a method which obviates the need for configuring interference measurement signal resources by a separate dynamic control channel.

For example, if a PRACH preamble is used as an interference measurement signal in 3GPP LTE/LTE-A, one of M possible sets of CSs of a ZC ZCZ sequence being orthogonal resources for the preamble signal may be indicated to a UE by user-specific RRC signaling. Herein, if existing PRACH preamble sets are used, M may be set to 64.

Method ii) A plurality of N candidate resource indexes for orthogonal resources of a signal to be used by each interference aggressor UE may be set as an RRC parameter and signaled preliminarily by user-specific signaling. Then, actual orthogonal resources may be configured in an N-bit bitmap or as many bits as a rounded-up integer of $\log_2(N)$ or $\log_2(N+1)$ on a user-specific dynamic channel. Method ii) is designed to compensate for the shortcoming of Method i) that if there are a number of aggressor UEs, there may be lack of orthogonal transmission resources for a D2D interference measurement signal.

That is, a plurality of N (<M) candidate transmission resources for an interference measurement signal from among total M transmission resources for an interference measurement signal configured by a BS are configured on an individual user basis by user-specific RRC signaling. Then, when the BS transmits an interference measurement signal to a specific UE, the BS configures a control information field in payload, with an N-bit bitmap or as many bits as a rounded-up integer of $\log_2(N)$, indicating actual transmission resources for the interference signal from among the N candidate transmission resources, and transmits the control information field on a dynamic user-specific control channel. Then, a receiving UE may be aware of the transmission resources for the interference measurement signal by receiving the control field.

Or in the case where triggering or non-triggering of transmission of an interference measurement signal is indicated by a control field, the control information field may be configured in payload, with an N-bit bitmap or as many bits as a rounded-up integer of $\log_2(N+1)$. For example, a user-specific dynamic control channel may be a PDCCH decoded in a UE-specific search space in the 3GPP LTE/LTE-A system. If there are three candidate transmission resources for a PRACH preamble, that is, N=3, a control field having a bit size of a rounded-up value of $\log_2(3)$ (if a triggering indication is included, a rounded-up value of $\log_2(4)$) is configured at a predetermined position of DCI of the PDCCH.

To decode the DCI format of this payload size, a UE should have prior knowledge of a total payload length including the control information added as a field. For this purpose, it is preferred that the network indicates explicitly whether the UE is a potential interference aggressor or implicitly indicates whether UL/DL resources of a user-specific flexible subframe interval are configurable for the UE, by UE-specific RRC signaling in advance.

Methods for applying a control field indicating transmission resources for an interference measurement signal to a DCI format among PDCCH DCI formats which are transmitted for transmission and reception of a specific UE and which the UE is supposed to blind-decode will be described below.

First, the control field may be applied to a DCI format designed for a UL grant. The control field indicates preamble transmission in corresponding UL resources. In this case, upon receipt of the UL grant, a UE transmits an interference measurement signal in the first available resources after predetermined P (equal to or larger than 1) subframes from the reception time of the UL grant. For example, P may be set to 4 to secure an appropriate decoding time.

Secondly, the control field may be applied to a DCI format designed for a DL grant. In this case, upon receipt of the DL grant, a UE transmits an interference measurement signal in the first available resources after predetermined Q (equal to or larger than 1) subframes from the reception time of the DL grant. For example, Q may be set to 4 to secure an appropriate decoding time.

Thirdly, the control field may be applied to both a DCI format designed for a UL grant and a DCI format designed for a DL grant. In this case, upon receipt of a corresponding PDCCH, a UE transmits an interference measurement signal in the first available resources after predetermined R (equal to or larger than 1) subframes from the reception time of the PDCCH. For example, R may be set to 4 to secure an appropriate decoding time.

Finally, Method iii): In the case where M sets of transmission resources are configured for transmission of an interference measurement signal from an interference aggressor as described above, actual orthogonal resources are indicated in an M-bit bitmap or as many bits as a rounded-up integer of $\log_2(M)$ or $\log_2(M+1)$ on a user-specific dynamic control channel on a UE basis.

Specifically, in the case where a total of M sets of transmission resources for an interference measurement signal are configured, a control information field may be configured in payload, with an M-bit bitmap or as many bits as a rounded-up integer of $\log_2(M)$, indicating transmission of an interference measurement signal or configuration of transmission resources on a user basis. Then, the control information field indicates actually used transmission resources from among the M candidate transmission resources for the interference measurement signal. Then, a receiving UE may be aware of the transmission resources for the interference measurement signal by receiving the control field.

Or in the case where triggering or non-triggering of transmission of an interference measurement signal is indicated by the control field, the control information field may be configured in payload, with an M-bit bitmap or as many bits as a rounded-up integer of $\log_2(M+1)$. For example, a user-specific dynamic control channel may be a PDCCH decoded in a UE-specific search space in the 3GPP LTE/LTE-A system. If there are 64 candidate transmission resources for a PRACH preamble, that is, M=64, a control field having a bit size of a rounded-up value of $\log_2(64)$, that is, 6 bits, or a rounded-up value of $\log_2(65)$, that is, 7 bits if a triggering indication is included is configured at a predetermined position of DCI of the PDCCH.

To decode the DCI format of this payload size, a UE should have prior knowledge of a total payload length including the control information added as a field. For this purpose, it is preferred that the network indicates explicitly whether the UE is a potential aggressor or implicitly indicates whether UL/DL resources of a user-specific flexible subframe interval are configurable for the UE, by UE-specific RRC signaling in advance.

Additionally, methods for applying a control field indicating transmission resources for an interference measurement signal to a PDCCH DCI format will be described below.

First, the control field may be applied to a DCI format designed for a UL grant. The control field indicates preamble transmission in corresponding UL resources. In this case, upon receipt of the UL grant, a UE transmits an interference measurement signal in the first available resources after predetermined P (equal to or larger than 1) subframes from the reception time of the UL grant. For example, P may be set to 4 to secure an appropriate decoding time.

Secondly, the control field may be applied to a DCI format designed for a DL grant. In this case, upon receipt of the DL grant, a UE transmits an interference measurement signal in the first available resources after predetermined Q (equal to or larger than 1) subframes from the reception time of the DL grant. For example, Q may be set to 4 to secure an appropriate decoding time.

Thirdly, the control field may be applied to both a DCI format designed for a UL grant and a DCI format designed for a DL grant. In this case, upon receipt of a corresponding PDCCH, a UE transmits an interference measurement signal in the first available resources after predetermined R (equal to or larger than 1) subframes from the reception time of the PDCCH. For example, R may be set to 4 to secure an appropriate decoding time.

B) DL Transmission of System Information

It is proposed that if $F^2$ user-specific TDD transmission is used, system control/management information is transmitted in a DL subframe of a user-common subframe interval in order to provide the reception performance of reliable system control/management information, that is, a Master Information Block (MIB) and a System Information Block (SIB) in the 3GPP LTE system.

In the 3GPP LTE/LTE-A system, for example, a PBCH carrying an MIB may be transmitted in a DL subframe of a user-common subframe interval, and a PDSCH carrying an SIB may be transmitted in a DL subframe of the user-common subframe interval. In the case of the PDSCH, a receiving UE performs blind decoding on a DL grant corresponding to the PDSCH in a common search space of PDCCH transmission resources of the DL subframe. Thus, the common search space may be configured in the DL subframe of the user-common subframe interval, for PDCCH blind decoding of the receiving UE.

Specifically, in the case where $F^2$ user-specific TDD transmission is used in the 3GPP LTE/LTE-A system, if one user-common subframe interval is configured in a 10-ms radio frame structure, a DL subframe carrying system control/management information is the first subframe. Or if two user-common subframe intervals are configured in a 10-ms radio frame structure, DL subframes carrying system control/management information is the first and sixth subframes.

C) UL Transmission of Random Access Preamble

Finally, if $F^2$ user-specific TDD transmission is used, it may be regulated that a UL PRACH preamble is transmitted in a UpPTS transmission symbol period of a special subframe in a user-common subframe interval or a UL subframe in the user-common subframe interval, for the purpose of reliable transmission and reception of the UL PRACH preamble.

The PRACH preamble transmission is for the purpose of transmission of a UE signal for D2D interference measurement and all other purposes. For example, in the case where $F^2$ user-specific TDD transmission is used in the 3GPP LTE/LTE-A system, if one user-common subframe interval is configured in a 10-ms radio frame structure, UL transmission time duration resources for a random access preamble is the UpPTS period of a special subframe in the second subframe, and the third subframe. Or if two user-common subframe intervals are configured in a 10-ms radio frame structure, UL transmission time duration resources for a random access preamble are the UpPTS periods of special subframes in the second and seventh subframes, and the third and eighth subframes.

Figure 16:
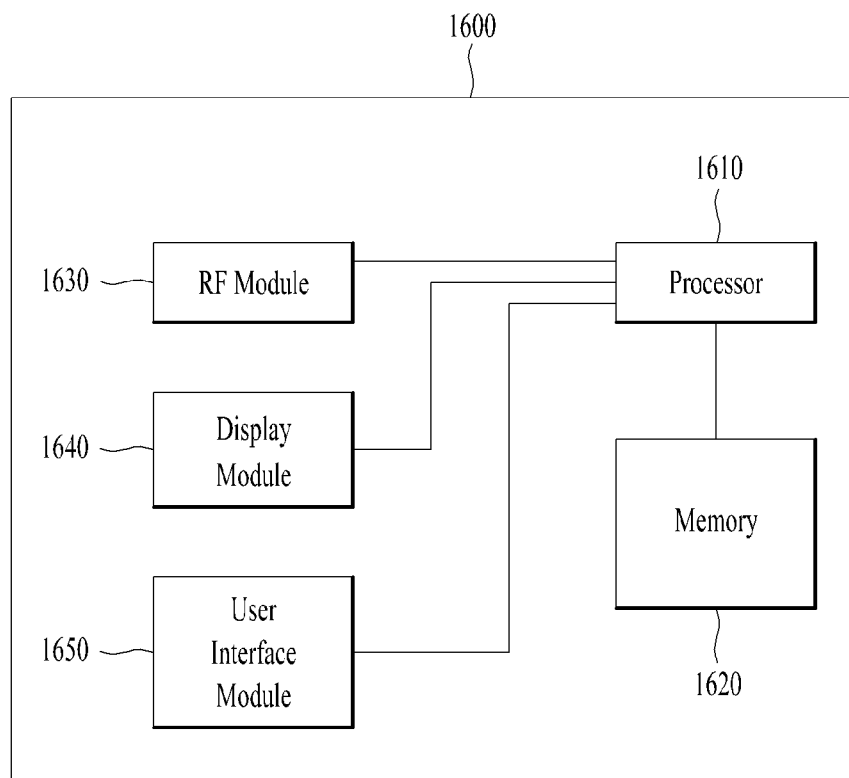
FIG. 16 is a block diagram of a communication apparatus according to an embodiment of the present invention.

FIG. 16 is a block diagram of a communication apparatus according to one embodiment of the present invention.

Referring to FIG. 16, a communication apparatus 1600 includes a processor 1610, a memory 1620, a Radio Frequency (RF) module 1630, a display module 1640 and a user interface module 1650.

The communication apparatus 1600 is shown for convenience of description and some modules thereof may be omitted. In addition, the communication apparatus 1600 may further include necessary modules. In addition, some modules of the communication apparatus 1600 may be subdivided. The processor 1610 is configured to perform an operation of the embodiment of the present invention described with reference to the drawings. For a detailed description of the operation of the processor 1610, reference may be made to the description associated with FIGS. 1 to 15.

The memory 1620 is connected to the processor 1610 so as to store an operating system, an application, program code, data and the like. The RF module 1630 is connected to the processor 1610 so as to perform a function for converting a baseband signal into a radio signal or converting a radio signal into a baseband signal. The RF module 1630 performs analog conversion, amplification, filtering and frequency up-conversion or inverse processes thereof. The display module 1640 is connected to the processor 1610 so as to display a variety of information. As the display module 1640, although not limited thereto, a well-known device such as a Liquid Crystal Display (LCD), a Light Emitting Diode (LED), or an Organic Light Emitting Diode (OLED) may be used. The user interface module 1650 is connected to the processor 1610 and may be configured by a combination of well-known user interfaces such as a keypad and a touch screen.

The above-described embodiments are proposed by combining constituent components and characteristics of the present invention according to a predetermined format. The individual constituent components or characteristics should be considered optional on the condition that there is no additional remark. If required, the individual constituent components or characteristics may not be combined with other components or characteristics. In addition, some constituent components and/or characteristics may be combined to implement the embodiments of the present invention. The order of operations disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

While the method and apparatus for transmitting and receiving signals using $F^2$ user-specific flexible TDD in a wireless communication system have been described in the context of the 3GPP LTE system, the present invention is applicable to various wireless communication systems other than the 3GPP LTE system.

The invention claimed is:

1. A method for transmitting and receiving signals to and from a Base Station (BS), by a User Equipment (UE), in a wireless communication system, the method comprising:
   when a physical random access channel (PRACH) transmission overlaps with an interference measurement signal transmission in a first subframe of a UE-common time resource interval of a time division duplex (TDD) radio frame and the UE incurs interference, transmitting an interference measurement signal in the first subframe of the UE-common time resource interval, the TDD radio frame including at least one UE-common time resource interval and at least one UE-specific flexible time resource interval;
   discarding the PRACH transmission in the first subframe of the UE-common time resource interval;
   receiving, when the BS incurs the interference, the interference measurement signal in a second subframe of the UE-common time resource interval of the TDD radio frame; and
   transmitting and receiving data to and from the BS in a UE-specific flexible time resource interval of the TDD radio frame, and
   wherein the UE-common time resource interval is composed of three subframes in the order of a downlink subframe, a special subframe, and an uplink subframe,
   wherein the first subframe corresponds to the special subframe or the uplink subframe of the UE-common time resource interval, and
   wherein the second subframe corresponds to the downlink subframe of the UE-common time resource interval.

2. The method according to claim 1, further comprising:
   receiving information about frequency resources for transmitting the interference measurement signal from the BS.

3. The method according to claim 1, further comprising:
   receiving system broadcasting information within the downlink subframe of the UE-common time resource interval.

4. A User Equipment (UE) in a wireless communication system, the UE comprising;
   a wireless communication module; and
   a processor that controls the wireless communication module to:
   when a physical random access channel (PRACH) transmission overlaps with an interference measurement signal transmission in a first subframe of a UE-common time resource interval of a time division duplex (TDD) radio frame and the UE incurs interference, transmit an interference measurement signal in a first subframe of a UE-common time resource interval, the TDD radio frame including at least one UE-common time resource interval and at least one UE-specific flexible time resource interval,
   wherein the processor is further configured to discard the PRACH transmission in the first subframe of the UE-common time resource interval;
   receive, when a base station (BS) incurs the interference, the interference measurement signal in a second subframe of the UE-common time resource interval, and
   transmit and receive data to and from the BS in a UE-specific flexible time resource interval of the TDD radio frame,
   wherein the UE-common time resource interval is composed of three subframes in the order of a downlink subframe, a special subframe, and an uplink subframe,
   wherein the first subframe corresponds to the special subframe or the uplink subframe of the UE-common time resource interval, and
   wherein the second subframe corresponds to the downlink subframe of the UE-common time resource interval.

5. The UE according to claim 4, wherein the processor further controls the wireless communication module to:
   receive information about frequency resources for transmitting the interference measurement signal from the BS.

6. The UE according to claim 4, wherein the processor further controls the wireless communication module to:
   receive system broadcasting information within the downlink subframe of the UE-common time resource interval.

* * * * *